ELECTRICAL CIRCUIT CONNECTOR

Filed Feb. 18, 1964 3 Sheets-Sheet 1

INVENTORS
GEORGE F. KELLEY
CLOIS W. TEDFORD
BY
Gerlach & Zimmerman

ELECTRICAL CIRCUIT CONNECTOR

Filed Feb. 18, 1964 3 Sheets-Sheet 2

INVENTOR.
GEORGE F. KELLEY
CLOIS W. TEDFORD
BY
Garber + Zimmerman

Jan. 17, 1967 G. F. KELLEY ETAL 3,299,393

ELECTRICAL CIRCUIT CONNECTOR

Filed Feb. 18, 1964 3 Sheets-Sheet 3

INVENTOR.
GEORGE F. KELLEY
CLOIS W. TEDFORD
BY
Gardner & Zimmerman

United States Patent Office 3,299,393

Patented Jan. 17, 1967

3,299,393

ELECTRICAL CIRCUIT CONNECTOR

George F. Kelley, Hayward, and Clois W. Tedford, Fremont, Calif., assignors to Q/T Circuits Co., San Lorenzo, Calif., a partnership Filed Feb. 18, 1964, Ser. No. 345,668
5 Claims. (Cl. 339—18)

This invention relates to an improved solderless connector device and more particularly to an electrical connector board, which can be changed to operate as a terminal board having bus bar strips, to operate as a matrix board, or to operate as a combination of terminal board and matrix board.

In setting up laboratory circuits it may be necessary to empirically try different valued circuit components until a desired result is achieved. If each circuit connection had to be soldered and unsoldered each time a new component was tried, much time would be consumed in setting up and dismantling the circuit. In addition, heat could travel along the component leads and seriously effect the characteristics of the element being connected. Threaded terminals could, of course, be used but they too require an expenditure of time in setting up circuits and they must be also checked for a tight connection after circuit set up.

Heretofore, solderless connectors have been used in which hard conductive elements such as balls have been inserted into cavities formed in a sheet of resilient material. As a ball was inserted into a cavity, electrical wires or conductive elements which extended over the edge of the cavity were carried into the cavity with the ball. When removal of the elements was necessary, the ball was withdrawn from the cavity and the leads withdrawn. As a result connection and disconnection of leads is a time consuming procedure.

Another connector arrangement has been to arrange resilient and deformable members to extend through and above conductive rings. By pulling upward on a portion of a deformable member which extends above the top of a ring, the member was stretched to decrease its diameter sufficiently to allow a wire or conductive element lead to be inserted into the spacing between the deformable member and the conductive ring. Thereafter the deformable member was released wherein it resiliently returned to its initial shape and diameter to hold the wire against the conductive ring. By necessity, the deformable members had to extend or project above the surface of the terminal board so that it could be gripped for pulling.

Accordingly it is an object of this invention to provide a solderless connector to which electrical wires can be insertably connected by the use of slight force and from which the electrical wire can be disconnected only with forces substantially greater than the insertion forces.

It is another object of this invention to provide a connector device in which connector portions are protected from physical abuse, shock, atmospheric corrosion, contamination and dirt and in which the electrically conductive surface thereof is protected from accidental short circuiting.

It is another object of the invention to provide a connector device of the above type in which the area around a connector portion is formed to provide ready access to the terminals when connecting a wire thereto and in which multiple circuit connections can be made at a single connector portion without disturbing already existing connections.

Another object of this invention is to provide connector means in which electric wire or circuit elements can be guided thereto without forming sharp bends and curvatures, and in which the wire is resiliently and frictionally held in electrical contact therewith.

Yet another object of this invention is to provide a connector device which can function as a terminal board having bus bar connectors, as a matrix board, or as any combination of the above.

Still another object of this invention is to provide a resilient connector in which the material adjacent the connection point is readily deformable to provide ease of circuit connection thereat.

Still another object of this invention is to provide a connector board of the above type which can be connected in circuit with a flat printed circuit or with individual circuit elements or with any combination of the above.

The invention possesses other objects and features of advantage, some of which, with the foregoing, will be set forth in the following description of the preferred forms of the invention which are illustrated in the drawings accompanying and forming part of the specification. It is to be understood, however, that variations in the showing made by the said drawings and description may be adopted within the scope of the invention as set forth in the claims.

Figure 1:
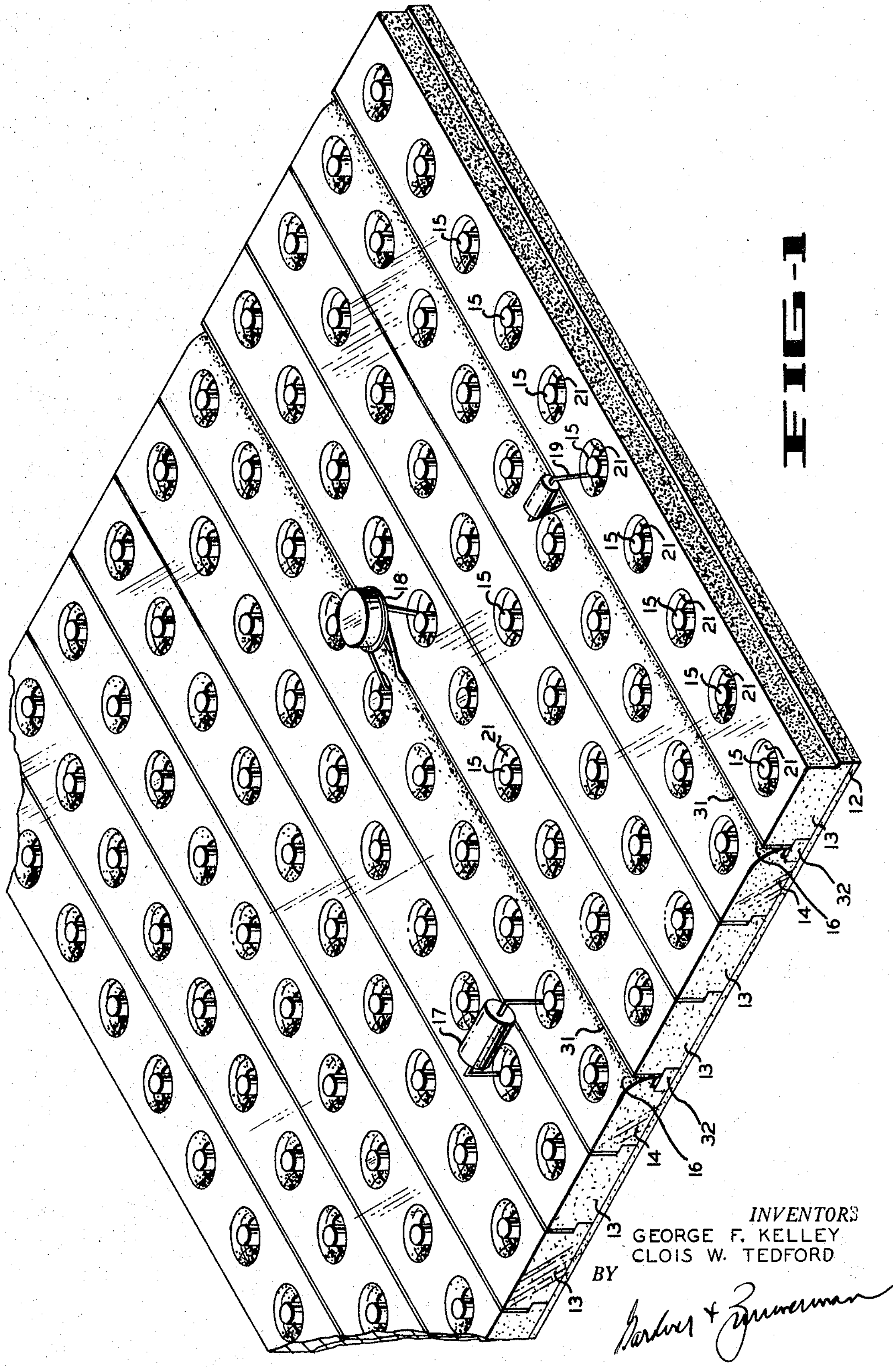
FIGURE 1 is a perspective view of the terminal board arrangement of this invention showing the interconnected relationship of certain circuit elements.
Figure 2:
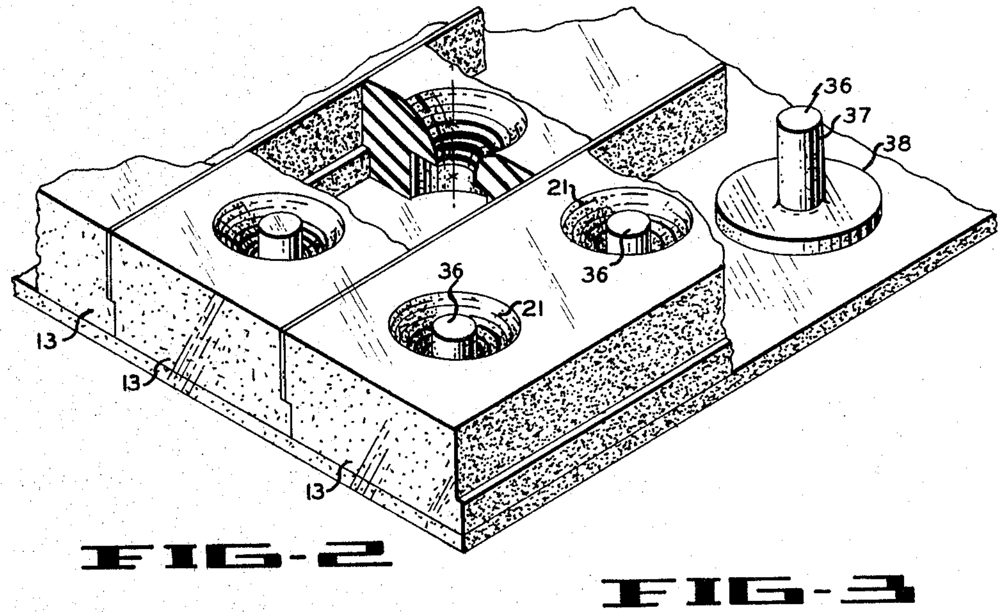
FIGURE 2 is a fragmentary perspective view of the terminal board arrangement of the invention in which ient insulating strips and the bus bars broken away to to show the relationship of the bus bar strip and the terminal post.

As illustrated in the drawings, there includes generally a mounting board or base 12 to which a plurality of resilient insulating blocks or strips such as 13 and 14 are secured in a parallel side by side arrangement. Each insulating block is elongated and is provided with a plurality of recessed terminals 15 equally spaced apart along the length thereof. In addition, bus bar connectors 16 can be mounted between the side walls of certain ones of the adjacent resilient insulating blocks 13 and 14. In operation, circuit elements such as 17, 18 and 19 can be connected between the terminals 15 and the bus bars 16 to set up circuits.

Referring to the details of the invention, the flat rectangular base plate 12 is made of phenolic or other relatively hard durable electrically insulating material.

In making a terminal board, a plurality of the resilient insulating blocks 13 and 14 are secured in side by side relationship to the flat upper surface 10 of the base plate 12 by means of chemical adhesives or any other conventional fastening means. Each of these insulating blocks is made of some deformable, resilient material of a rubbery nature and having electrical insulating properties. One such material is polyurethane.

Figure 3:
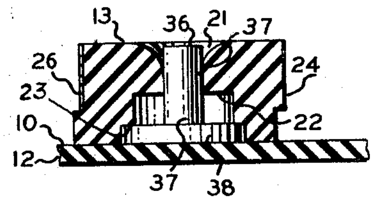
FIGURE 3 is a partial cross sectional side elevational view taken through one of the terminal connectors with the terminal post shown in full section.
Figure 4:
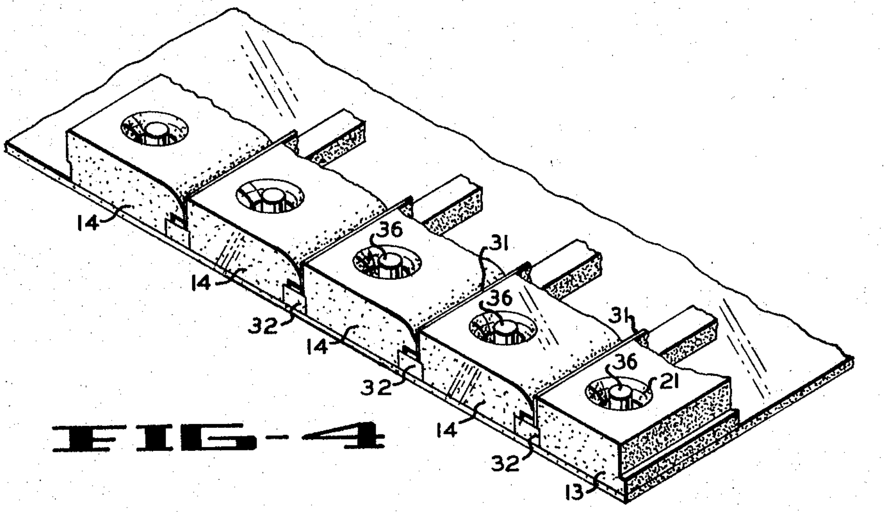
FIGURE 4 is a fragmentary perspective view of the terminal board with the portions of the resilient insulating strips and the bus bar strips broken away to show the relationship of the spacer bars and the base board.

Now referring to the details of the insulating blocks 13, each of this type block is formed with a plurality of spaced apart apertures 21 extending vertically therethrough. As more clearly illustrated in FIGURE 3 the upper portion of aperture 21 is formed with an annular shelf 22 having an outwardly flared upper surface. The lower end of aperture 21 is increased in diameter to form a shoulder 23. Each exterior side wall 24 and 26 of the elongate blocks 13 is stair stepped in a complementary manner so that each adjacent resilient block 13 will be interlocked or matched with one another to insure that the upper surface formed by the plurality of side by side blocks is relatively level except at the flared apertures 21.

Figure 6:
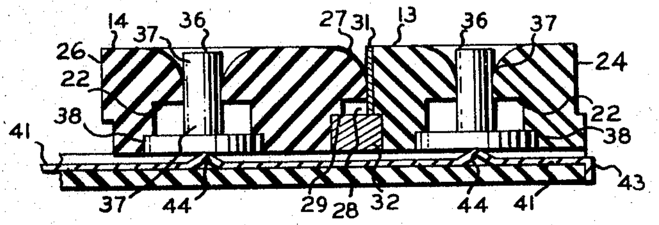
FIGURE 6 is a partial cross sectional side elevational view of a connector showing the terminal posts in full section and the interconnection of matrix bus bar nodes with the bases of the terminal posts.

The second type of resilient insulating block 14 can be used alone or together with insulating blocks 13 to provide the bus bar connection 16. As illustrated in FIGURE 6, this type of resilient insulator block 14 has one rounded edge which forms a lip 27 having a rounded upper surface. This lip 27 projects sideways from the wall and is adapted to extend toward the stepped out portion of side wall 26 of an adjacent insulating block. Side wall 26 of block 14 is stepped to complement the side wall 24 of blocks 13. The lower portion of the rounded side wall is formed with stepped rabbets 28 and 29 to provide space between adjacent wall surfaces.

The bus bar connector 16 includes a strip of conductive metal 31 inserted or connected between the flat stepped-out side wall 26 of resilient insulator block 13 and the rounded lip 27 of an adjacent insulator block 14. Because of the resilient nature of rounded lip 27 the bus bar strip 31 is secured against withdrawal or movement. The upper edge of metal strip 31 is flush with the upper surface of the resilient insulating block while the lower edge rests along the top of rectangular spacer 32 made of phenolic or other insulating material. Any leads connected to bus bar connector 16 are inserted between lip 27 and metal strip 31 to provide a common circuit connection with any other element connected to the same strip 31. Because of the configuration of the rounded lip 27, the resilient material deforms downwardly more readily than it does upwardly. As a result electrical wires can be easily connected with slight downward forces but cannot be withdrawn except with a relatively greater upwardly directed force.

Each of the plurality of terminal connectors 15 includes an electrically conductive terminal member 36 extending upward within aperture 21. Each of these terminal members 36 includes an electrically conducting post 37 secured to project upward from an electrically conducting circular flange 38. One terminal member 36 is provided for each aperture 21 with the circular flange portion 38 received within the lower shoulder 23 and with the upward projecting post portion 37 disposed along the aperture axis in contact with annular shelf 22. The innermost edge of the annular shelf 22 and the surface of terminal post 37 are in intimate contact with one another when so positioned. Thus by deformably moving the post and the relatively resilient insulating material away from each other, it is possible to create a gap which permits slidable insertion of a wire or other electrical connector therein. The top of terminal post 37 is recessed slightly below the planar upper surface of the insulating block 13 and 14 so that the terminal is protected against accidental short circuiting movement and displacement.

When connecting a wire or electrical lead to a terminal member 36, the wire is inserted downward alongside the vertical post 37. Because of the configuration of the annular shelf 22, the resilient material thereof deforms downwardly into the lower cavity more readily than it deforms upwardly. Thus, as previously stated for the bus bar connector, an electrical wire can be more easily inserted than withdrawn. An advantage of this arrangement is that very thin wires (50 gauge) can be inserted without collapsing and yet are difficult to withdraw. Thus it is not necessary to contact or move the conductive terminal member 36 when connecting wires thereto thereby eliminating the need for auxiliary tools.

In order to increase the connector reliability the surface of terminal connector 36 could be nickel plated. In addition, the large conductive surface permits multiple circuit connections at terminal post 37, as well as at any one of the bus bars 31 thereby providing operational variety in setting up "bread board" circuits.

Figure 5:
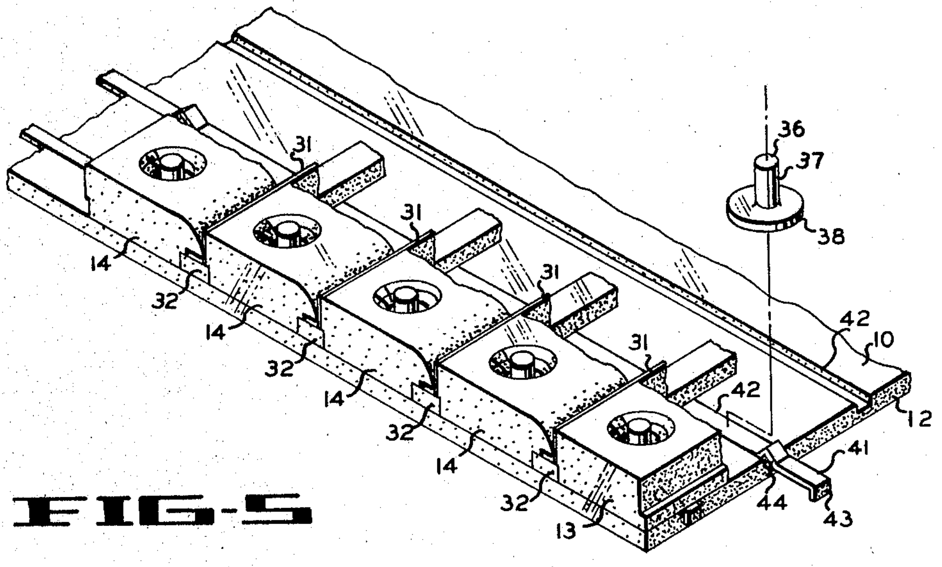
FIGURE 5 is a fragmentary perspective view of the matrix board embodiment of the invention with the resilient insulating strips and the bus bars broken away to illustrate the laterally slotted mounting base and a matrix bus bar strip partially slidably inserted within one of the lateral slots.

By using the bus bar connectors 16 as an X matrix, the transverse ranks of terminal connectors 15 can be connected in series to form a Y matrix. In the matrix board configuration illustrated in FIGURES 5 and 6, the upper surface of base plate 12 is transversely slotted relative to bus bar connector 16 at parallel spaced apart intervals to provide a path for slidably receiving nodular matrix bus bar strips 41 to interconnect the terminal connectors 15 in each rank. In order to interconnect the terminals 15 each of the transverse slots 42 are spaced apart a distance equal to the distance between adjacent apertures 21 and cross under bus bar strip 31 each at a right angle. As a result the matrix bus bars will be positioned directly under the cylindrical flange portion 38 of each terminal member 36. The outermost end of matrix bus bar strip 41 is turned downward to provide a push and pull tab 43 for inserting and withdrawing the bus bar strip 41 from the transverse slots 42. Of course the tabs can also be used as contact surfaces with other external circuits. Each matrix bus bar strip 41 is provided with a plurality of nodes such as 44 which project upward and contact the bottom surface of terminal member flange 38 to provide electrical connection therewith. By making these matrix bus bar strips 41 of some electrically conductive material a circuit connection is formed between terminals 36 in that particular rank hereinafter referred to as a Y matrix. Of course, it should be understood that select ones of nodes 44 could be omitted thereby programming the terminal strips 41 to provide a certain select circuit configuration or network with circuit elements connected to the upper ends of the terminal post. By using bus bar connectors 16 as an X matrix, a matrix board configuration is created for use with different switching arrangements. This is especially desirable on computer or switching circuitry where matrices are very prevalent and where it is necessary to experiment with them quite frequently. It should, of course, be understood that the withdrawal of the matrix bus bar strips 41 converts the board into the conventional terminal and bus bar connector board.

It should also be understood that the invention can be used to connect flat printed circuits. With printed circuits, having a flat edge, two insulating blocks 14 having rounded edges can be placed adjacent each other to form a single long aperture which receives the printed circuit.

Although several embodiments of this invention have been described in detail for purposes of explanation, it should be understood that other changes can be made in the invention as is obvious to a man ordinarily skilled in the art and that the invention is only limited by the scope of the appended claims.

What is claimed is:

1. An electrical connector device comprising a mounting member of rigid electrically nonconductive material, a plurality of insulating blocks of resilient material each secured to the surface of said mounting member in parallel adjacent side by side relationship, each said block being formed with a plurality of spaced apart apertures extending from the upper surface therethrough, the upper portion of each aperture being flared outwardly, a plurality of terminal members of electrically conductive material operably connected through said apertures with the upper end thereof recessed below the upper surface of said insulating strip whereby an electrical member inserted into the aperture and against said terminal member operably causes said electrical member to be resiliently and frictionally held against the terminal member for electrical connection therewith, a bus bar strip of electrically conductive material insertably connected between adjacent pairs of resilient blocks whereby an electrical member inserted between said strip and the side wall of said adjacent insulating strip operably causes said electrical member to be frictionally and resiliently held against the bus bar strip to create an electrical connection therewith.

2. The electrical conductor connector device of claim 1 in which one of the block side walls adjacent to said bus bar member is formed with a lip having a flared outward portion to define an elongate aperture.

3. The electrical connector device of claim 1 in which each said aperture is flared outwardly at the upper portion thereof to expose the upper end of said terminal shaft.

4. An electrical connector comprising a mounting member of rigid electrically insulating material, the surface of said mounting member being formed with a plurality of parallel, spaced apart matrix grooves, a plurality of elongate insulating blocks of resilient material, said blocks being secured to the upper surface of said mounting member in parallel side-by-side relationship intersecting said matrix grooves, each of the said blocks being formed with a plurality of spaced apart apertures extending from the upper surface therethrough, a plurality of electrically conductive terminal members each connected to extend through the individual ones of the apertures, a plurality of matrix bus bar members each being formed with a plurality of contact portions formed thereon at distances about equal to the distance between axes of adjacent insulating blocks, the contact portions of said matrix bus bars contacting said terminal members to create an electrical interconnection between adjacent terminal members in said parallel side-by-side blocks, and bus bar members of electrically conductive material mounted between adjacent side walls of said resilient insulator blocks to form a matrix circuit arrangement with relation to said interconnected terminal members.

5. The electrical connector device or board of claim 4 in which said matrix bus bar member is adapted to be slidably inserted into and withdrawn from the transverse mounting member grooves whereby particular ones of adjacent terminal members are interconnected or disconnected to change said terminal members from a matrix terminal to a single terminal connector.

References Cited by the Examiner

UNITED STATES PATENTS

| | | | |
|---|---|---|---|
| 2,240,180 | 4/1941 | Frank | 339—59 X |
| 2,506,615 | 5/1950 | Rosen | 339—18 X |
| 2,619,515 | 11/1952 | Doane | 339—63 X |
| 3,105,729 | 10/1963 | Rosenthal et al. | 339—18 |
| 3,235,830 | 2/1966 | Newton | 339—18 |

FOREIGN PATENTS

| | | | |
|---|---|---|---|
| 1,123,341 | 6/1956 | France. | |

EDWARD C. ALLEN, *Primary Examiner.*

PATRICK A. CLIFFORD, *Examiner.*